(12) United States Patent
Pérez Rigueiro et al.

(10) Patent No.: US 11,156,635 B2
(45) Date of Patent: Oct. 26, 2021

(54) METHOD FOR OBTAINING FUNCTIONALISED SENSOR TIPS FOR ATOMIC FORCE MICROSCOPY BY MEANS OF ACTIVATED VAPOUR SILANISATION AND TIPS OBTAINED USING SAID METHOD

(71) Applicant: UNIVERSIDAD POLITÉCNICA DE MADRID, Madrid (ES)

(72) Inventors: José Pérez Rigueiro, Madrid (ES); Gustavo Víctor Guinea Tortuero, Madrid (ES); Rafael Daza García, Madrid (ES); Luis Colchero Paetz, Madrid (ES)

(73) Assignee: UNIVERSIDAD POLITÉCNICA DE MADRID, Madrid (ES)

( * ) Notice: Subject to any disclaimer, the term of this patent is extended or adjusted under 35 U.S.C. 154(b) by 0 days.

(21) Appl. No.: 17/261,066

(22) PCT Filed: Jun. 28, 2019

(86) PCT No.: PCT/ES2019/070456
§ 371 (c)(1),
(2) Date: Jan. 18, 2021

(87) PCT Pub. No.: WO2020/021136
PCT Pub. Date: Jan. 30, 2020

(65) Prior Publication Data
US 2021/0293851 A1 Sep. 23, 2021

(30) Foreign Application Priority Data
Jul. 27, 2018 (ES) .............................. ES201830777

(51) Int. Cl.
*G01Q 60/42* (2010.01)

(52) U.S. Cl.
CPC ................................... *G01Q 60/42* (2013.01)

(58) Field of Classification Search
CPC ...................................................... G01Q 60/42
(Continued)

(56) References Cited

U.S. PATENT DOCUMENTS

2007/0082352 A1 4/2007 Cumpson
2011/0008801 A1 1/2011 Camesano
(Continued)

FOREIGN PATENT DOCUMENTS

FR        2965624 A1    4/2012
KR   20150071876 A    6/2015
(Continued)

OTHER PUBLICATIONS

RJ Martin-Palma et al., Surface biofunctionalization of materials by amine groups, Journal of Materials Research vol. 19, No. 8 (Aug. 2004), pp. 2415-2420 United Kingdom.
(Continued)

*Primary Examiner* — Nicole M Ippolito
(74) *Attorney, Agent, or Firm* — Jayne Marie Saydah

(57) ABSTRACT

The invention relates to a method for obtaining a functionalised sensor tip for atomic force microscopy, which is characterised in that functionalisation takes place by means of an activated vapour silanisation process, comprising: a) evaporating an organometallic compound containing at least one silicon atom and at least one functional group selected from an amine group, a hydroxyl group, a carboxyl group and a thiol group; b) activating the vapour of the organometallic compound of step a) by heating; and c) causing the activated vapour of step b) to impinge on a sensor tip for atomic force microscopy in order to deposit a film of the organometallic compound on the sensor tip, steps b) and c)
(Continued)

taking place consecutively. The invention also relates to the functionalised sensor tip obtained using the method.

15 Claims, 6 Drawing Sheets

(58) Field of Classification Search
USPC .......................................... 850/42, 56, 60, 61
See application file for complete search history.

(56) References Cited

U.S. PATENT DOCUMENTS

| | | | |
|---|---|---|---|
| 2012/0096602 A1* | 4/2012 | Martines ................ | B82Y 35/00 850/40 |
| 2015/0076339 A1* | 3/2015 | Fedorov .................. | H01J 37/28 250/282 |
| 2017/0225433 A1* | 8/2017 | Okuyama ........... | H01L 21/6836 |

FOREIGN PATENT DOCUMENTS

| | | |
|---|---|---|
| WO | 2007/109689 A2 | 9/2007 |
| WO | 2012084994 A1 | 6/2012 |

OTHER PUBLICATIONS

P. Rezvanian et al., Enhanced biological response of AVS-functionalized Ti—6Al—4V alloy through covalent immobilization of collagen, Scientific Reports 8 (Feb. 2018), pp. 1-11, Unitied Kingdom.

Barattin R., Voyer N. (2011) Chemical Modifications of Atomic Force Microscopy Tips. In: Braga P., Ricci D. (eds) Atomic Force Microscopy in Biomedical Research. Methods in Molecular Biology (Methods and Protocols), vol. 736. Humana Press, https://doi.org/10.1007/978-1-61779-105-5_28.

International Search Report for PCT/ES2019/070456, dated Aug. 28, 2019, English Translation.

PCT Written Opinion of International Searching Authority for PCT/ES2019/070456, dated Jun. 9, 2019, English Translation.

Volcke, C. et al., Plasma functionalization of AFM tips for measurement of chemical interactions, Journal of Colloid and Interface Science, Aug. 15, 2010, vol. 348, No. 2, pp. 322-328, ISSN 0021-9797.

Arroyo-Hernåndez, M., et al., Optimization of functionalization conditions for protein analysis by AFM, Applied Surface Science, Aug. 20, 2014, vol. 317, pp. 462-468, ISSN 0169-4332, <DOI: 1.1016/j.apuse.2014.07.201>.

Lin, C.-Y., et al., Detection of DNA hybridization using functionalized InN ISFETs, Materials Research Society Symposium Proceedings—III-Nitride Materials for Sensing, Energy Conversion and Controlled Light-Matter Interactions 2010, Nov. 30, 2009, vol. 1202, 41-46, ISSN 0272-9172 (print) ISBN 978-1-60511-175-9; abstract.

Jianwei, L, et al., Single molecule labeling of an atomic force microscope cantilever tip, Applied Physics Letters, Oct. 15, 2012, vol. 101, No. 16, p. 163705-1-163705-3, ISSN 0003-6951, <DOI: doi:10.1063/1.4760283>.

Creasey, R., et al., Atomic force microscopy-based antibody recognition imaging of proteins in the pathological deposits in Pseudoexfoliation Syndrome. Ultramicroscopy, Mar. 11, 2011, vol. 111, No. 8, pp. 1055-1061, ISSN 0304-3991, <DOI: doi:10.106/j.ultramic.2011.03.008>.

Lopez-Paz, J.L., et al., Direct and label-free monitoring oligonucleotide immobilization, non-specific binding and DNA biorecognition. Sensors and Actuators B: Chemical: international journal devoted to research and development of physical and chemical transducers, Mar. 1, 2014, vol. 192, pp. 221-228, ISSN 0925-4005, <DOI: doi:10.1016/j.snb.2013.10.1107>; paragraph: "Materials and Methods".

Ozkan, A.D., et al., Probe microscopy methods and applications in imaging of biological materials, Seminars in Cell and Developmental Biology, Aug. 12, 2017, vol. 73, pp. 153-164, ISSN 1084-9521, <DOI: doi:10.1016/j.semcdb.2017.08.0187>.

Daza, R., et al., Functionalization of atomic force microscopy cantilevers and tips by activated vapour silanization, Applied Surface Science, Aug. 1, 2019, vol. 484, pp. 1141-1147, ISSN 0169-4332 (print);<DOI: doi: 10.106/j.apsusc.209.04.155>.

* cited by examiner

METHOD FOR OBTAINING FUNCTIONALISED SENSOR TIPS FOR ATOMIC FORCE MICROSCOPY BY MEANS OF ACTIVATED VAPOUR SILANISATION AND TIPS OBTAINED USING SAID METHOD

CROSS-REFERENCE

This application is the U.S. National Stage of International Application No. PCT/ES2019/070456 filed on Jun. 28, 2019, which claims the benefit of priority from Spanish Patent application No. P201830777 filed on Jul. 27, 2018, the contents of which are both herein incorporated by reference in their entirety.

BACKGROUND OF THE INVENTION

Field of the Invention

The invention falls within the area of near field microscopies and, particularly, of atomic force microscopy and the instrumentation required in this area, by obtaining a functionalised sensor tip for atomic force microscopy by means of activated vapour silanisation (AVS).

The AVS functionalised tip can be useful for using atomic force microscopy as a microstructural characterisation technique in Materials Science or Biology, among other applications.

Description of Related Art

Atomic force microscopy (AFM) is an extremely versatile microstructural characterisation technique that enables the study of a wide range of systems under various environmental conditions. Atomic force microscopy falls within the group of near field microscopies wherein the sensor element is located a very short distance from the surface to be observed. In the case of atomic force microscopy the sensor element is a cantilever, generally equipped with a tip with micrometric dimensions at the end thereof. The atomic force microscope has a positioning system in the three spatial directions: X, Y and Z, which enables the distance between the tip and the surface of the sample (conventionally identified by the Z direction) to be varied while sweeping the sample surface (conventionally identified by the X and Y directions). The interactions established between the tip and the surface of the sample flex the cantilever, a relationship between the cantilever flexure and the force to which the tip is subjected due to the interaction thereof with the surface at a given instant being able to be established. The sweep along the X and Y directions, carried out by moving the cantilever along the Z axis so as to maintain a constant value of the cantilever flexure, enables the isoforce lines on the surface to be obtained. When the dominant interaction is the contact interaction due to steric repulsion between the tip and the surface of the material, the isoforce lines obtained are considered to correspond to the surface topography of the sample.

The very general principles on which atomic force microscopy is based makes it highly versatile compared to other near field microscopy, optical microscopy and electron microscopy techniques. Particularly, the AFM makes it possible to work under a wide variety of environmental conditions, including vacuum, air and various liquid mediums. Particularly, the possibility of working in liquid mediums is a unique opportunity to observe biological systems under in vivo conditions, which are often beyond the scope of most other microscopic techniques. Furthermore, the dependency of the sensor system on the interactions established between the tip and the sample offers a wide range of elements that can be characterised in said sample if said interactions can be controlled.

The combination of the ability to characterise biological systems in vivo within a suitable liquid medium, and the possibility of exploring said biological systems using specific probes, for example, antibodies that recognise a certain biomolecule, has led to the development of the so-called chemical atomic force (C-AFM) or affinity microscopy. Taking into account the previous discussion, it is found that the critical element to be able to characterise a sample according to C-AFM principles is the availability of tips for AFM that are capable of establishing specific interactions with the various elements that may be present in the sample to analyse. Obtaining tips for AFM that can be used for C-AFM conventionally requires two steps: (1) a modification of the tip surface (functionalisation) so that functional groups are generated on the surface thereof, and (2) a stable binding (in general, by means of a covalent bond) between the functional groups on the surface of the tip and the molecule that establishes a specific interaction with certain surface elements. Experience shows that the first step, consisting of modifying the surface of the tip to generate functional groups therein is the most complicated from the point of view of the development of viable technologies.

Commonly employed strategies for functionalising tips for AFM are based on two alternative procedures (R. Barattin and N. Voyer, Chemical modifications of tips for AFM for the study of molecular recognition events, Chem. Commun. 13 (2008), 1513-1532. On the one hand, a procedure based on the deposition of a thin gold film or similar has been described, so that the subsequent binding of the recognition molecule takes advantage of a specific interaction between the deposited film and a region of the molecule itself. The characteristic example of this procedure is the fixing of molecules containing a thiol group (also called sulfhydryl group, —SH) on a thin gold film, that takes advantage of the high affinity of the thiol group for the metal surface. An alternative procedure is the use of an organometallic molecule with the ability to bind to functional groups spontaneously present on the surface of the tip. The typical example of this procedure is the binding of 3-aminopropyltriethoxysilane (APTES) molecules to hydroxyl groups (—OH) present on the surface of the tip or that is generated by exposing the tip to an oxidising environment.

The technological development of both alternative procedures appears developed in a series of patent documents. Thus, among the technologies corresponding to the first group is patent application US2007/0082352 A1 (Peter Jonathan Cumpson, Microscopy tip) wherein a procedure for binding deoxyribonucleic acid (DNA) molecules to tips for AFM is shown. In the procedure described, DNA molecules are initially modified by binding them to an organic molecule that contains a thiol group (—SH). The tip for AFM on which the DNA is to be immobilised is modified by depositing a thin gold film on it. The fixing of DNA molecules on the tip is the result of the affinity that thiol groups show for gold in the metallic phase.

Among the documents describing technologies based on the second type of procedures is patent application WO2007/109689 A2 (Gallardo-Moreno et al., *A method for functionalizing an atomic force microscopy tip*) wherein a polylysine coating is deposited on an unmodified tip. In this case, functionalisation is achieved by means of a non-specific interaction that is established between the polylysine molecules, that are positively charged, and the unmodified tip surface. Alternatively, a valid procedure has been proposed for silicon nitride or silicon oxide tips, so that an appreciable number of hydroxyl groups are first generated on the tip surface, molecules of the dendrimer type being subsequently bound to said hydroxyl groups. Said procedure is described in patent application FR2965624 A1 (Dague Etienne, et al., Modified atomic force microscope tip comprises surface covalently grafted by phosphor dendrimers and having at their periphery, several terminal functions allowing covalent fixing of dendrimers on surface and biomolecules on the dendrimers). The process described in patent application KR1020150071876 A (Shim Bong Chushim et al., *Method for analyzing nucleic acid sequence using atomic force microscope*) is also based on the initial generation of an appreciable density of hydroxyl groups in the tip for AFM. Hydroxyl groups are generated by exposing the tip to a 20% nitric acid solution, a monolayer of APTES molecules being subsequently formed on the surface as a consequence of the reaction of the organometallic molecules with the hydroxyl groups previously generated on the surface. The binding of proteins and/or nucleic acids to the tip was carried out either directly by means of the amine groups present in the APTES molecules or by means of a dendrimer molecule that was located between the tip and the biomolecule (protein and/or nucleic acid).

Among the proposed procedures for functionalising tips for AFM, it is worth mentioning patent application WO2012/084994 A1 (Polesel-Maris, Jerome, et al., Atomic force microscope probe, method for preparing same, and uses thereof) the main feature of which is that it represents a procedure that shares features of the two families of basic procedures described above. In this case the original tip is modified to expose a graphite surface thereon. Subsequently, the graphite surface is chemically modified to generate —OH groups on the surface and, in a last step, said groups react with various organic molecules to expose on the surface different functional groups capable of covalently binding biomolecules.

Thus, one of the major drawbacks of the tip functionalisation procedures proposed in previous studies is the need to develop a prior procedure for activating the surface of the material used to manufacture the tip for AFM, this prior procedure being different depending on the type of material used. Furthermore, the functionalisation procedure must be compatible with the biomolecule to be subsequently immobilised on the tip for AFM. Consequently, there is a technological need to develop new versatile procedures for the functionalisation of tips for AFM, which are as general as possible, both in terms of the materials of the tips that can be functionalised and of the biomolecules with which said functionalisation procedures are compatible.

In this context, the present invention provides a sensor tip for chemical atomic force microscopy (C-AFM), wherein functionalisation takes place using the activated vapour silanisation technique (AVS). This technology has already been previously described (RJ Martin-Palma et al., *Surface biofunctionalization of materials by amine groups*, J. Mater. Res. 19 (2004), 2415-2420), in applications mainly focused on the field of biomaterials and materials for medical use (P. Rezvanian et al., *Enhanced biological response of AVS-functionalized Ti-6Al-4V alloy through covalent immobilization of collagen*, Scientific Reports 8 (2018), 3337), the general feature of which is the use thereof in samples with an essentially flat surface topography.

AVS technology has demonstrated the ability to deposit a functionalised thin film on flat substrates to which it is possible to covalently bind various biomolecules, such as extracellular matrix proteins such as collagen or fibronectin. However, this document describes the procedure wherein the AVS technique is used to efficiently functionalise tips for AFM, with a much steeper topography than the flat substrates wherein AVS technology has been applied so far, so that said tips can act as sensor elements in chemical atomic force (or affinity) microscopy procedures.

BRIEF SUMMARY OF THE INVENTION

The present invention is based on work carried out in the field of thin film deposition and in the field of atomic force microscopy. The inventors have found that the activated vapour silanisation technique makes it possible to obtain functionalised tips for atomic force microscopy, exhibiting a high density of amine (—$NH_2$), carboxyl (—COOH), thiol (—SH) and/or hydroxyl (—OH) groups on the surface thereof. The following presents and describes the procedure for producing functionalised tips for AFM by means of the AVS technique.

Thus, the present invention provides a method for obtaining a functionalised sensor tip for atomic force microscopy (AFM), which is characterised in that functionalisation takes place by means of an activated vapour silanisation process, comprising:
  a) evaporating an organometallic compound containing at least one silicon atom and at least one functional group selected from the group consisting of an amine group (—$NH_2$), carboxyl group (—COOH), thiol group (—SH), hydroxyl group (—OH) and a combination of the above;
  b) activating the vapour of the organometallic compound of step a) by heating to a temperature between 400 and 1000° C.; and
  c) causing the activated vapour from step b) to impinge on a sensor tip for atomic force microscopy to deposit the organometallic compound on said sensor tip;
steps b) and c) taking place consecutively.

Obtaining functionalised tips requires a first step of evaporation of an organometallic, the molecule of which contains at least one silicon atom and at least one amine (—$NH_2$), carboxyl (—COOH), thiol (—SH), hydroxyl (—OH) group or a combination of the above. Subsequently, the vapour is subjected to a heating step and, next, it is caused to impinge on the AFM tip to be functionalised. In order to avoid the degradation of the activated organometallic compound, steps b) and c) follow one another without interruption, so that the activation step takes place immediately before the activated vapour is caused to impinge on the AFM tip.

In the method described in this document, the evaporation and activation steps can take place in different regions of the same unit, or even different units from the same installation. In that case, the vapour obtained in the evaporation region is transported hot, preferably at a temperature higher than the evaporation temperature of the organometallic compound in question, to the region wherein the activation step b) will take place.

The present invention further relates to the functionalised tips for AFM obtained by the method described herein. These tips are characterised by the base material of the tip, a thickness of the functional film preferably in a range between 50 nm and 1 μm; and a high density of amine, carboxyl, thiol and/or hydroxyl groups on the surface.

Particularly, in the case of using an organometallic compound with amine groups, values close to eight amine groups per nm$^2$ can be reached, which approximately corresponds to the theoretical surface density of a monolayer of amine groups on a flat surface. Said density can be measured, based on their ability to covalently bind fluorescent markers.

Thus, unlike other procedures for functionalising tips for AFM such as, for example, that which is described in patent application KR1020150071876 A1, wherein a monolayer of organometallic molecules attached to the hydroxyl groups generated on the surface of the tip material is created, in the method of the present invention a thin film is created, preferably between 50 nm and 1 µm, formed by the decomposition of organometallic molecules, the formation of this film being independent of the chemistry of the surface of the material of the tip to be functionalised.

BRIEF DESCRIPTION OF THE SEVERAL VIEWS OF THE DRAWING

To improve the description of the invention it is useful to refer to the Figures included in this document. It must be emphasised that, following common practice, the drawings and diagrams of the figures are not to scale. Instead, the dimensions of the different elements have been increased or reduced arbitrarily with the sole intention of facilitating the understanding of the indicated details. The figures included in this document are.

DETAILED DESCRIPTION OF THE INVENTION

The present invention provides a method for obtaining a functionalised sensor tip for atomic force microscopy (AFM), which is characterised in that functionalisation takes place by means of an activated vapour silanisation process, comprising:

a) evaporating an organometallic compound containing at least one silicon atom and at least one functional group selected from the group consisting of an amine group (—NH$_2$), carboxyl group (—COOH), thiol group (—SH), hydroxyl group (—OH) and a combination of the above;

b) activating the vapour of the organometallic compound of step a) by heating to a temperature between 400 and 1000° C.; and c) causing the activated vapour from step b) to impinge on a sensor tip for atomic force microscopy to deposit the organometallic compound on said sensor tip;

steps b) and c) taking place consecutively.

Figure 1:
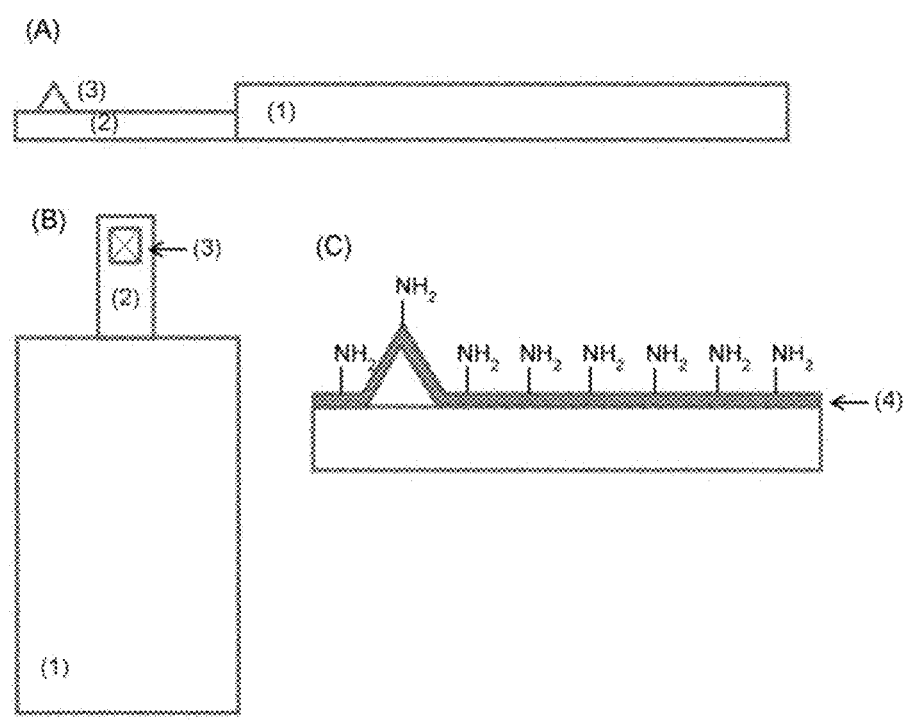
FIG. 1. Diagram of the cross-section of the functionalised tip. (A) Cross-section of a conventional tip for AFM indicating the fundamental elements: (1) Chip, (2) Cantilever and (3) Tip. (B) Plan view of a conventional tip for AFM with an indication of the fundamental elements. (C) Cross section of the tip/cantilever functionalised by means of AVS, wherein the functionalised film (4) is shown. The presence of reagent groups on the surface is indicated, which in this case are particularised to amine groups (NH$_2$).

The functionalisation method described herein is based on sensor tips for AFM, generally bound in a larger structure called chip (see FIG. 1), and comprises the functionalisation of these tips when they come into contact with the activated vapour of organometallic molecules. The interaction between the tip for AFM and the activated vapour leads to the formation of a film on it so that fragments of the organometallic molecule remain active and exposed to the external medium. Preferably, the thickness of the film is between 50 nm and 1 µm, as thicknesses greater than 1 µm could lead to delamination of the film deposited on the tip for AFM.

Tips for AFM that present active organic fragments on the surface thereof are called functionalised and the main property thereof is that the presence of said active organic fragments modifies the interaction of the tip with the medium. The use of functionalised tips for AFM modifies the sensing capacity of the AFM technique and the range of measurements that can be obtained with this technique.

Without being bound by any theory, the inventors consider that the presence of the functionalised film, preferably with a thickness between 50 nm and 1 µm, is the result of the partial decomposition of the organometallic molecule as a consequence of the thermal activation thereof. The activated molecules that impinge on the surface interact with it and with each other, resulting in a solid film on the surface, but in which some of the organic fragments of the original organometallic molecule are kept, said fragments keeping their activity and being exposed to the outside of the tip.

The sensor element in atomic force microscopy is a tip that is located near the surface to be studied and that appears at the end of a cantilever that flexes as a result of the interaction between the tip and the surface. The cantilever, in turn, is at the end of a more massive structure, generally with parallelepiped geometry conventionally called chip (see FIG. 1). The typical dimensions of chips in commercial tips are in the millimetre range, the typical sizes of the cantilevers being in the order of tens of microns in the directions perpendicular to that defined by the tip, and a few microns in the latter direction. Lastly, the size of the tip can vary from tens of nanometres to ten microns. There is no limitation, in theory, to the composition of the tips for AFM provided that they are compatible with the manufacture of elements with the geometry indicated above. In practice, most commercial tips for AFM are made of silicon (SI) or silicon nitride ($SI_3N_4$). The functionalisation process of the present invention does not imply any restriction on the geometry of the chips, nor on the composition thereof as long as the size thereof enables the sensor tip to be activated in the activation region.

Moreover, the organometallic compound used in the method of the present invention is made up of molecules that have a common structure wherein a silicon atom is bound to one or several hydrocarbon chains, wherein at least one of these chains comprises one or more amine (—$NH_2$), hydroxyl (—OH), carboxyl (—COOH) or thiol (—SH) groups.

In preferred embodiments of the present invention, the organometallic compound comprises one or more hydrocarbon chains —$(CH_2)_n$—, wherein n is a number between 1 and 30, preferably between 1 and 6; and at least one functional group selected from the group consisting of hydroxyl group (—OH), carboxyl group (—COOH), thiol group (—SH), amine group (—$NH_2$) and a combination of the above.

The hydrocarbon chains of the organometallic compound used in the method of the present invention can comprise one or more double or triple bonds between carbon atoms.

Examples of molecules that can be used as an organometallic compound for the activated vapour silanisation process described herein are 3-aminopropyltriethoxysilane (APTES) and aminopropyltrimethoxysilane (APTES), both leading to the formation of films containing amine groups; mercaptopropylmethoxysilane (MPTMS), with which films containing thiol groups are produced; triethoxysilylpropylmaleamic acid, with which films containing carboxyl groups are produced; and N-triethoxysilylpropyl-O-polyethylene oxide, with which films containing hydroxyl groups are produced. In combination with the structure itself of the molecule, an important feature of the organometallic compound is the boiling point thereof. Particularly, it is preferred that the boiling temperature of this compound be between 100° C. and 250° C.

The evaporation step a) can be carried out by depositing an organometallic fluid in an evaporation chamber located inside an evaporation furnace, such that the temperature of the organometallic fluid can be varied. The temperature increase of the evaporation chamber above the boiling point of the organometallic fluid leads to the liquid-vapour phase transition with the formation of organometallic vapour inside the evaporation chamber. Preferably, the temperature range to which the evaporation furnace is heated is between 50° C. and 400° C., being even more preferred that this temperature is between 100° C. and 250° C. and, being especially preferred that the temperature in the evaporation step a) is between 130° C. and 200° C. The range of evaporation temperatures will depend on the specific organometallic compound, fixing as the maximum limit of the temperature of said range that which produces the decomposition of the organometallic molecule.

Preferably, the activation step b) can take place by heating to a temperature between 400 and 900° C., more preferably between 400 and 800° C., as temperatures that are too high favour the appearance of irregularities and inhomogeneities in the deposited films.

The organometallic vapour activation step can be carried out in an installation which comprises a deposition chamber wherein the AFM tips to be functionalised are located, and another region, preferably in tube form, immediately before the deposition chamber and directly connected thereto. According to these embodiments, the activation region corresponds to the region of the tube immediately before the deposition chamber and directly connected thereto. Furthermore, an activation furnace is located around the activation region, defining the extension thereof and enabling a controlled increase in temperature in said activation region. Thus, in the activation region, the organometallic vapour evaporated in the evaporation chamber passes through a region of high temperature before entering the deposition chamber and impinging on the tips for AFM.

The efficiency of the method improves when carried out in a vacuum, avoiding the reaction of the organometallic molecule with atmospheric gases, primarily oxygen. The need to heat the organometallic compound during the evaporation step and, subsequently, during the activation step creates a favourable situation for oxidising the organometallic compound with atmospheric oxygen. Said reaction can decompose the organometallic compound, preventing the functionalisation of the substrate. Thus, carrying out the method, particularly steps a), b) and c) described above, in a vacuum system which enables a residual vacuum between $10^{-4}$ and $10^{-1}$ mbar is advantageous to avoid the decomposition mentioned above. Said vacuum can be achieved with a rotary pump coupled to a cold trap.

In the method described in this document, the evaporation and activation steps can take place in different regions of the same installation and, particularly, in different chambers of the same unit or even different units. In that case, the vapour obtained in the evaporation region is transported hot, preferably at a temperature higher than the evaporation temperature of the organometallic compound in question, to the region wherein the activation step will take place.

In those embodiments of the method of the invention wherein one or more of the evaporation, activation or deposition steps of the organometallic compound on the AFM sensor tip to be functionalised take place in different regions, the use of a carrier gas that facilitates the transit of the organometallic vapour from one region to another is preferred, particularly, from the evaporation chamber to the activation region and, finally, to the deposition chamber, wherein the activated vapour can impinge on the tip for AFM. This carrier gas must be an inert gas with respect to the organometallic compound, so a possible choice is a noble gas such as argon, although eventually the use of molecular nitrogen or carbon dioxide could be considered. The introduction of the carrier gas into the system leads to an increase in the pressure therein, the range of working pressures as a consequence of the introduction of the carrier gas preferably being between $10^{-2}$ and 100 mbar, more preferably between $5 \times 10^{-1}$ and 10 mbar.

Preferably, in the method for obtaining a functionalised sensor tip for AFM described in this document, the period of impingement of the activated organometallic vapour on the tip for AFM is between 1 and 120 minutes.

As mentioned earlier, there may be a gap between the evaporation chamber and the activation region, both zones generally attached by a connection tube. This separation involves the transit of vapour along an extension of the connection tube before entering the activation region. In order to prevent the condensation of organometallic vapour during said transit, it is convenient to surround the connection tubes between the evaporation chamber and the activation region with a heating element, which can be a heating tape. Said heating tape must maintain the temperature of the connections at a temperature equal to or higher than the evaporation temperature of step a) of the method of the invention, in order to prevent condensation of the organometallic vapour before it reaches the activation region.

Figure 2:
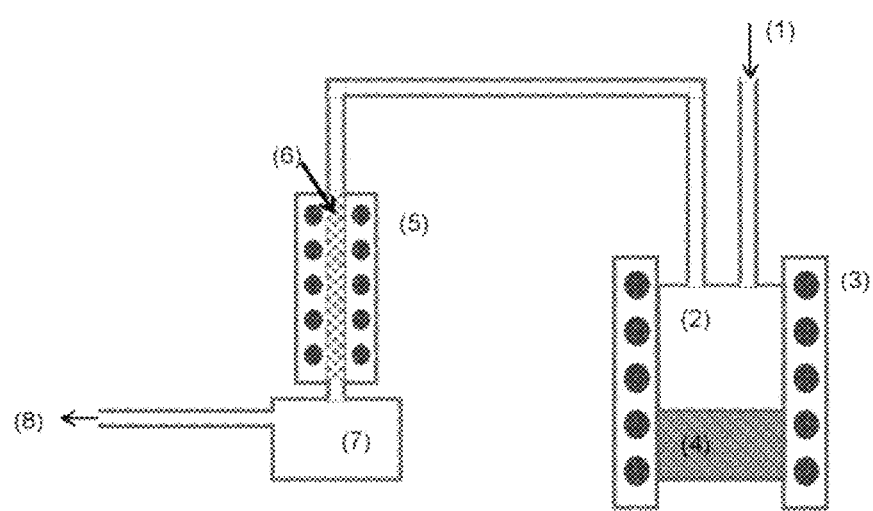
FIG. 2. Diagram of the essential elements of a unit used for manufacturing functionalised tips for AFM by means of preferred embodiments of the method of the present invention. (1) Carrier gas inlet. (2) Evaporation chamber. (3) Evaporation furnace. (4) Organometallic compound. (5) Activation furnace. (6) Activation region. (7) Deposition chamber. (8) Outlet to the vacuum system.
Figure 3:
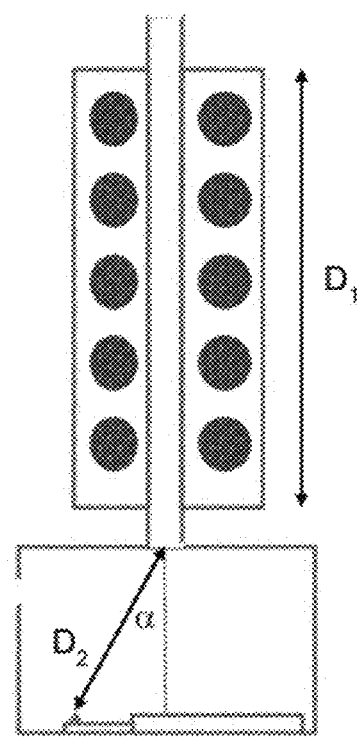
FIG. 3. Detail of the activation furnace and the deposition chamber with the definition of the main geometric parameters. D1: Activation furnace length, D2, distance between the activation furnace outlet and the tip for AFM, and a, angle formed by the line joining the activation furnace exit and the tip for AFM with the axis of the activation region.

The deposition chamber may comprise a holder for the tips for AFM, which enables the position of the tips in the deposition chamber to be defined as well as keeping them immobile throughout the process. In particular embodiments of the invention, the geometry of the tip is defined by the distance of the tip from the outlet of the tube from the activation region ($D_2$; FIG. 3) and by the angle that the tip forms with respect to the vertical at said outlet in the direction of the vapour flow (a; FIG. 3). Particularly, in the method described herein, the tips to be functionalised are positioned so that, in step c), the activated organometallic vapour impinges on the tips to be functionalised at an angle between 0° and 60°. Particularly, when the method takes place in the unit described in this document (see FIG. 2), the aforementioned angle α corresponds to the angle of the sensor tip to be functionalised with respect to the mouth opening of the activation region in the deposition chamber, opening through which the activated organometallic vapour is introduced into the deposition chamber. In this way, a compromise is achieved between the flow density (number of molecules/area/time) and the area covered, taking into account that the vapour flow takes an approximate cone shape when entering the deposition chamber.

Figure 4:
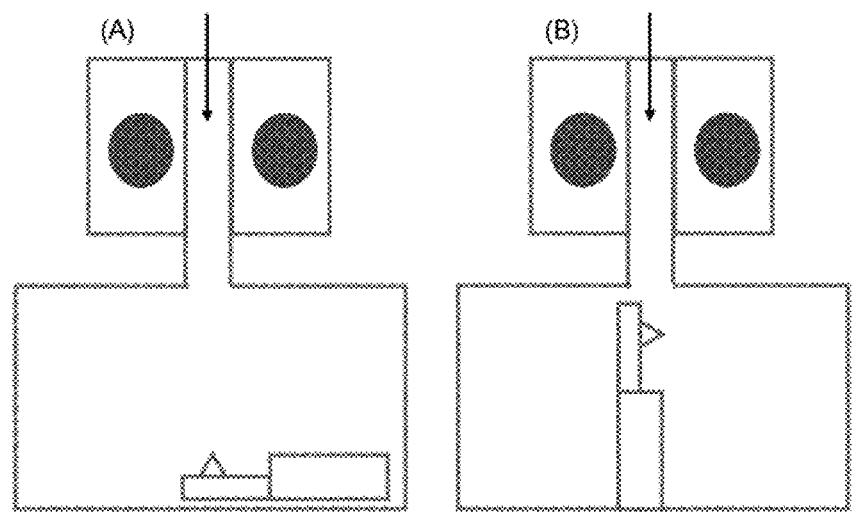
FIG. 4. Diagram of two possible orientations of the tip with respect to the vapour flow. (A) Tip holder cantilever oriented perpendicular to the direction of vapour flow. (B) Tip holder cantilever oriented parallel to the direction of vapour flow. The direction of the activated vapour flow at the inlet to the activation chamber is indicated by an arrow.

Furthermore, it is possible to carry out the functionalisation of the tip for AFM in two alternative orientations: tip holder cantilever oriented perpendicular to the direction of the vapour flow (FIG. 4A), or tip holder cantilever oriented parallel to the direction of the vapour flow (FIG. 4B). With this last orientation it is possible to reduce the mass of organometallic compound deposited on the strip and on the rest of the chip. Particularly, the reduction in the mass of organometallic compound deposited on the strap entails a reduction in the movement of the main resonance frequency of the strip, with respect to the value measured before the functionalisation.

Without being bound by any theory, it is believed that the functionalisation of the tips for AFM in particular embodiments of the present invention is the result of the following processes: Forming of the organometallic vapour in the evaporation chamber, dragging of the organometallic vapour from the evaporation chamber to the activation region, heating of the organometallic molecules within the activation region, impinging of the molecules thus activated on the surface of the tip for AFM resulting in the formation of a film, preferably with a thickness between 50 nm and 1 μm, on the tip. The activation process is sufficient to induce the interaction of the organometallic molecules with each other and with the tip material, so that a film is deposited on the surface of the material of the AFM tip, but keeping a portion of the organic groups of the molecule before treatment.

The present invention further relates to the functionalised sensor tips for AFM that have a film deposited on the surface thereof, and said film comprises reagent groups selected from the group consisting of amine group (—$NH_2$), carboxyl group (—COOH), thiol group (—SH), hydroxyl group (—OH) and a combination of the above. Said tips are obtained by the method described in this document and are characterised in that the functionalisation process results in the deposition of a functional film, preferably with a thickness in a range between 50 nm and 1 μm. Particularly, the tips functionalised by the method of the present invention can have a density of amine groups on the surface that can reach values close to eight amine groups per $nm^2$, based on their ability to covalently bind fluorescent markers.

Thus, the functionalised sensor tips of the present invention may have functionalised films on the surface thereof, such that said thin films have a thickness within the range between 50 nm and 1 μm, and containing reagent groups such as amine group (—$NH_2$), hydroxyl group (—OH), carboxyl group (—COOH), thiol group (—SH) or combination of the above, so that these functional groups are exposed to the outside. Said reagent groups may or may not be bound to hydrocarbon chains —$(CH_2)_n$—, wherein n is a number between 1 and 30.

Furthermore, the present invention relates to the use of the functionalised sensor tips described herein in atomic force microscopy.

The method for obtaining a functionalised tip for AFM described in this document can be carried out in a unit comprising:
An evaporation chamber,
An evaporation furnace configured for heating the evaporation chamber,
An activation region, preferably in tube form, connected to the evaporation chamber,
An activation furnace configured for heating the activation region, and
A deposition chamber connected downstream of the activation region.

In particular embodiments, the activation region has a length in the range between 100 mm and 300 mm, which makes it possible to reach the desired activation temperature in the organometallic vapour at higher working pressures or, equivalently, at higher vapour flows.

In other particular embodiments of the invention, the activation region has a mouth opening to the deposition chamber, and the tip to be functionalised is located at a distance between 1 mm and 50 mm with respect to said opening. As a consequence of the dispersion of the organometallic vapour flow when entering the deposition chamber, this range of distance values results from a compromise between values of the vapour flow density sufficiently high inside the deposition chamber and a sufficiently large impingement surface that enables the homogeneous functionalisation of samples with a size of the order of cm.

Preferably, the angle formed by the imaginary line joining the tip with the mouth opening of the activation region in the deposition chamber with the flow direction of the organometallic vapour is in the range between 0° and 60°. As in the previous section, this range of angle values results from the compromise between the flow density of the organometallic vapour within the deposition chamber and the area of impingement swept by said flow.

In particular embodiments of the invention, the AFM tip holder cantilever is oriented perpendicularly to the direction of the organometallic vapour flow. Alternatively, the AFM tip holder cantilever is oriented parallel to the direction of the organometallic vapour flow.

EXAMPLES

The examples that follow are included to provide those skilled in the art with a complete description of how to carry out and apply the present invention. They should not be construed in any way as limiting the scope of what the inventors regard as their invention, nor should they be assumed to constitute a complete list of all the experiments carried out. Unless otherwise indicated, the temperature is indicated in degrees centigrade and the pressure in millibars.

Example 1

The following table shows the range of the parameters of the functionalisation process used for the deposition of functionalised films on silicon nitride ($Si_3N_4$) tips for AFM.

| Parameter | Value or Value range |
|---|---|
| Organometallic composition | 3-Aminopropyltriethoxysilane (APTES)/ mercaptopropylmethoxysilane (MPTMS) |
| Carrier gas | Argon/Molecular Nitrogen |
| Evaporation temperature (° C.) | 130-200 |
| Working pressure of the system during deposition (mbar) | 0.5-2 |
| Vapour activation temperature (° C.) | 650-800 |
| Activation region length, $D_1$ (mm) | 150-200 |
| Distance from the tip to the outlet from the activation region, $D_2$ (mm) | 1-10 |
| Angle of the tip with the direction of vapour flow at the outlet of the activation region α | 0°-45° |
| Orientation of the tip with respect to the vapour flow at the outlet of the activation region | Tip holder cantilever oriented perpendicular to the direction of vapour flow (FIG. 4A)/Tip holder cantilever oriented parallel to the direction of vapour flow (FIG. 4B) |
| Deposition time (min) | 5-30 |

Example 1.1 particularly, the following implementation of the invention has enabled functionalised tips for AFM to be obtained by means of AVS. Organometallic composition: 3-aminopropyltriethoxysilane; carrier gas: argon; evaporation temperature: 170° C.; working pressure of the system: 1 mbar; activation temperature: 750° C.; activation region length: 150 mm; distance from the tip to the outlet from the activation region: 5 mm; angle of the tip with the direction of flow at the outlet of the activation region: 20°; orientation of the tip with respect to the vapour flow at the outlet from the activation region: horizontal (FIG. 4A); deposition time: 20 minutes.

Some Properties of Functionalised Tips for Atomic Force Microscopy

Figure 5:
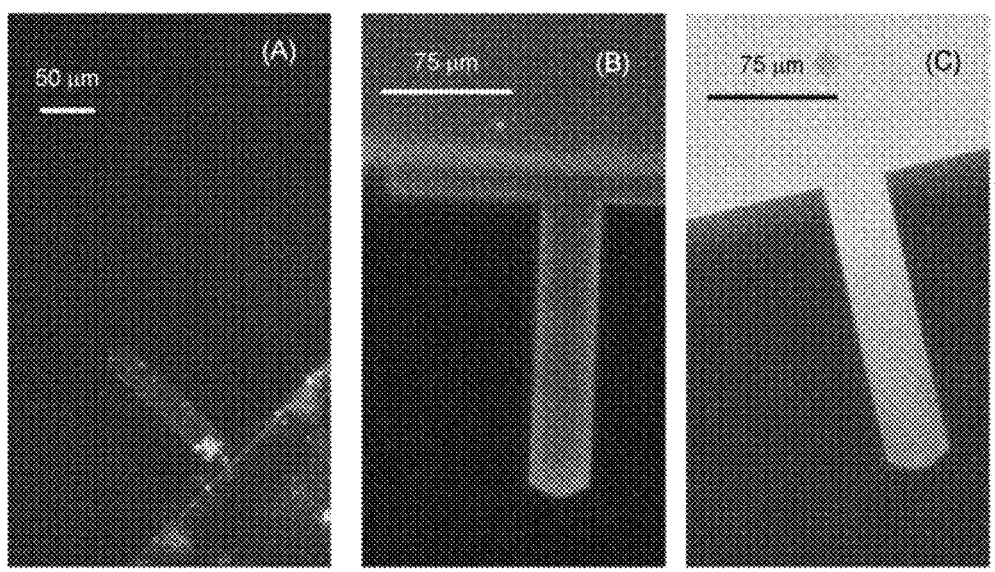
FIG. 5. The existence of the functionalised thin film on the cantilever and tip surfaces is verified by using a fluorescent molecule (fluorescein isothiocyanate) which reacts covalently with amine groups. (A) Control sample on which the functionalised thin film has not been deposited. (B) Functionalised cantilever/tip system following the deposition conditions of the Example with a deposition time of 10 minutes. (C) Functionalised cantilever/tip system following the deposition conditions of the Example with a deposition time of 20 minutes.

The possibility of functionalising tips for AFM by means of the procedure described in this document was experimentally validated. Following the details of Example 1.1 presented in the previous Section, the organometallic compound used for the functionalisation was 3-aminopropyltriethoxysilane. The use of this organometallic compound leads to the formation of a film the thickness of which is between 100-200 nm and on the surface of which a high density of surface amine groups (—$NH_2$) appears. To verify the existence of amine groups on the surface of the AFM tip, the fluorescein isothiocyanate molecule was chosen. Said molecule has a fluorescent region that emits at a wavelength corresponding to the colour green and an isothiocyanate group, that interacts with amine groups creating a covalent bond. The functionalised AFM tips and non-functionalised control AFM tips were incubated with a solution of fluorescein isothiocyanate, being subsequently washed to eliminate the remains of fluorescent molecules that were not covalently bound to the material. The tips were observed in a fluorescence microscope and representative results of the resulting images are shown in FIG. 5. All the images presented in FIG. 5 were obtained under the same observation conditions, so the intensity of the observed fluorescence is a semi-quantitative measurement of the density of amine groups on the surface of the AFM cantilever.

FIG. 5A corresponds to the non-functionalised control cantilever, a very low fluorescence being observed, practically indistinguishable from the background fluorescence which is observed outside the contour defined by the cantilever. By contrast, FIGS. 5B and 5C correspond to tips for AFM functionalised under the conditions indicated in the previous Example for 10 minutes and 20 minutes respectively. The increase in fluorescence with respect to the control sample is evident, also showing how said fluorescence appears homogeneously distributed over the entire cantilever surface. It is also observed that the intensity of the fluorescence increases in this case with the deposition time, being greater in the sample wherein the deposition had a duration of 20 minutes.

Figure 6:
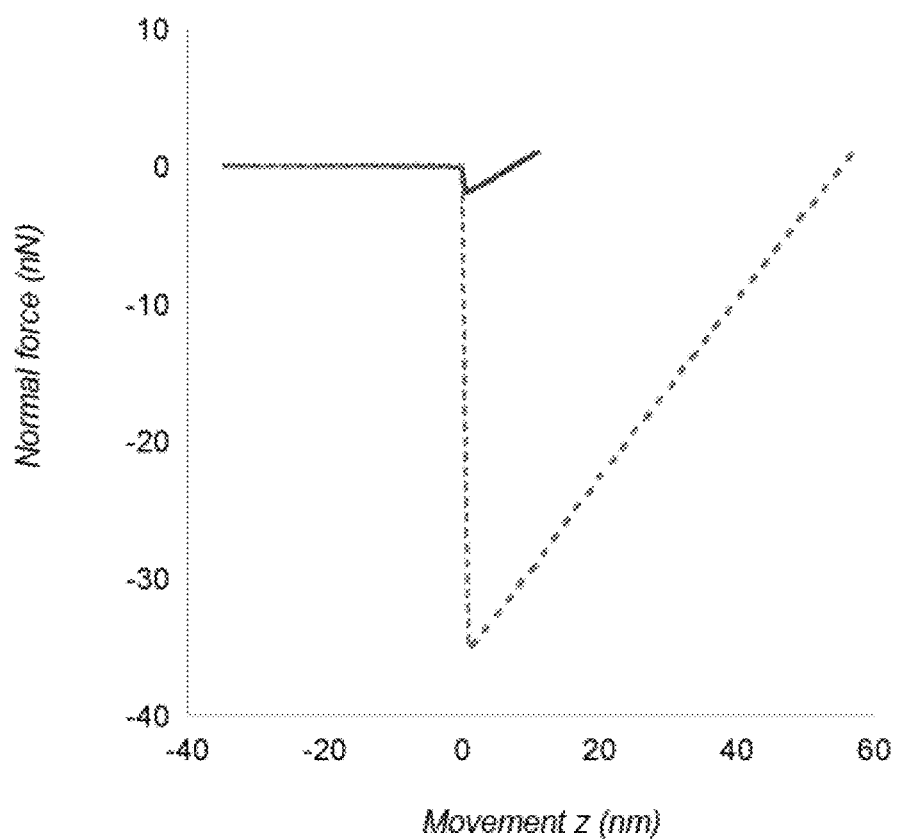
FIG. 6. Modification of the adhesion of the AFM tips caused by the functionalisation and subsequent covalent binding of an organic molecule. Fz curve of a non-functionalised sample (solid line) and of a functionalised sample to which fluorescein isothiocyanate has been covalently bound (dashed line). An increase in the adhesion force between the tip and the HOPG substrate from 2 nN is observed in the non-functionalised tip, up to 37 nN with the functionalised tip.

Additionally, the tips for AFM to which the fluorescein isothiocyanate molecules had been covalently bound were used to verify that said binding could be detected from the different interaction between the tip and the sample after the binding of the fluorescein molecule to the same. Particularly, force curves were obtained of the force on the tip versus distance between a model graphite substrate (HOPG) and functionalised tips or control tips (F-z curves). A representative F-z curve of the interaction between a non-functionalised control tip and a model HOPG substrate is shown in FIG. 6. A representative F-z curve of the interaction of a functionalised tip to which fluorescein isothiocyanate has been covalently bound and the same model HOPG substrate is shown in FIG. 6B. The main difference between the two curves focusses on the adhesion region that corresponds to the separation of the tip from the substrate. The adhesion force of the functionalised tip is greater by a factor of 2 to 10 than the adhesion force of the non-functionalised control tip and the substrate itself. Without being bound by any theory, it is assumed that said increase in the adhesion force is the result of an increase in the tip-sample interaction due to the presence of the characteristic organic groups of the fluorescein molecule.

The invention claimed is:
1. A method for obtaining a functionalised sensor tip for atomic force microscopy, which is characterised in that functionalisation takes place by means of an activated vapour silanisation process, comprising:
 a) evaporating an organometallic compound containing at least one silicon atom and at least one functional group selected from the group consisting of an amine group (—$NH_2$), carboxyl group (—COOH), thiol group (—SH), hydroxyl group (—OH) and a combination of the above;
 b) activating the vapour of the organometallic compound of step a) by heating to a temperature between 400 and 1000° C.; and
 c) causing the activated vapour from step b) to impinge on a sensor tip for atomic force microscopy to deposit the organometallic compound on said sensor tip forming a film with a thickness between 50 nm and 1 µm, wherein steps b) and c) take place consecutively.

2. The method for obtaining a functionalised tip according to claim 1, wherein the sensor tip to be functionalised is made of silicon nitride (Si3N4) or silicon (Si).

3. The method for obtaining a functionalised tip according to claim 1, wherein the organometallic compound comprises one or more hydrocarbon chains —(CH2)n-, wherein n is a number between 1 and 30; and at least one functional group selected from the group consisting of hydroxyl group (—OH), carboxyl group (—COOH), thiol group (—SH), amine group (—NH2) and a combination of the above.

4. The method for obtaining a functionalised tip according to claim 1, wherein the organometallic compound is selected from the group consisting of 3-aminopropyltriethoxysilane (APTES), aminopropyltrimethoxysilane (APTMS), mercaptopropylmethoxysilane (MPTMS), triethoxysilylpropyl-maleamic acid and N-triethoxysilylpropyl-O-polyethylene oxide.

5. The method for obtaining a functionalised tip according to claim 1, wherein the organometallic compound is 3-aminopropyltriethoxysilane (APTES).

6. The method for obtaining a functionalised tip according to claim 1, wherein the evaporation step a) is carried out by heating in a temperature range between 100° C. and 250° C.

7. The method for obtaining a functionalised tip according to claim 1, wherein the activation step b) takes place by heating to a temperature between 400° C. and 900° C.

8. The method for obtaining a functionalised tip according to claim 1, wherein the evaporation, activation and/or deposition steps take place in a residual vacuum within the range 10-4 and 10-1 mbar.

9. The method for obtaining a functionalised tip according to claim 1, wherein one or several of the evaporation, activation or deposition steps of the organometallic compound take place in different regions, and an inert gas flow is used for transporting the organometallic vapour from one region to another.

10. The method for obtaining a functionalised tip according to claim 9, wherein the inert gas is argon or molecular nitrogen.

11. The method for obtaining a functionalised tip according to claim 9, wherein the pressure of the system is in the range 10-2 and 100 mbar.

12. The method for obtaining a functionalised tip according to claim 1, wherein step c) comprises a period of impingement of the activated organometallic vapour on the tip for AFM between 1 and 120 minutes.

13. The method for obtaining a functionalised tip according to claim 1, wherein in step c) the activated organometallic vapour impinges on the tips to be functionalised at an angle between 0° and 60°.

14. The method for obtaining a functionalised tip according to claim 1, wherein the sensor tip is located in a cantilever, and this is oriented perpendicular to the direction of the activated organometallic vapour flow.

15. The method for obtaining a functionalised tip according to claim 1, wherein the sensor tip is located in a cantilever, and this is oriented parallel to the direction of the activated organometallic vapour flow.

* * * * *